United States Patent
Boudrieau

(10) Patent No.: US 7,183,946 B2
(45) Date of Patent: Feb. 27, 2007

(54) SAFETY AIRCRAFT FLIGHT SYSTEM

(76) Inventor: Gary Jon Boudrieau, P.O. Box 37, North Lakewood, WA (US) 98259

( * ) Notice: Subject to any disclaimer, the term of this patent is extended or adjusted under 35 U.S.C. 154(b) by 0 days.

(21) Appl. No.: 10/605,625

(22) Filed: Oct. 14, 2003

(65) Prior Publication Data

US 2004/0107027 A1    Jun. 3, 2004

Related U.S. Application Data

(60) Provisional application No. 60/319,613, filed on Oct. 11, 2002.

(51) Int. Cl.
    *G08B 21/00*   (2006.01)
(52) U.S. Cl. .................. 340/945; 340/961; 244/76 R; 244/189; 701/11
(58) Field of Classification Search .............. 340/961, 340/945, 971; 244/118.5, 76 R, 189; 701/14, 701/9.2, 11
    See application file for complete search history.

(56) References Cited

U.S. PATENT DOCUMENTS

| | | | | |
|---|---|---|---|---|
| 4,835,537 A | * | 5/1989 | Manion | ........................ 342/30 |
| 5,714,948 A | * | 2/1998 | Farmakis et al. | ........... 340/961 |
| 6,385,513 B1 | * | 5/2002 | Murray et al. | ................ 701/14 |
| 6,641,087 B1 | * | 11/2003 | Nelson | .................... 244/118.5 |
| 6,658,572 B1 | * | 12/2003 | Craig | .......................... 726/16 |
| 6,732,022 B2 | * | 5/2004 | Mardirossian | ................. 701/3 |
| 6,810,310 B1 | * | 10/2004 | McBain | ........................ 701/3 |

* cited by examiner

*Primary Examiner*—Brent A. Swarthout
(74) *Attorney, Agent, or Firm*—Seed IP Law Group PLLC

(57) ABSTRACT

The present invention is a computer system designed to use the conventional devices and special programming of the present invention that will ensure the safe operation of aircraft. The present invention is an anti-terrorist and Anti-Crash System to ensure and maintain complete control of an aircraft on the ground, during taxiing and even in the air. With the present invention in place, an aircraft can be kept a safe distance from any building and other aircraft, and the aircraft can be remotely controlled. The system provides greater national security. Utilizing the On-Demand audio and visual monitoring components of the present invention, simultaneously, proper authorities can access all factual data from all onboard flight systems before a crash is imminent. Equipment lockouts are in place as well, so that if an aircraft is commandeered, the actual person in the cockpit is unable to effect aircraft travel, virtually eliminating human error.

15 Claims, 1 Drawing Sheet

SAFETY AIRCRAFT FLIGHT SYSTEM

BACKGROUND OF INVENTION

Field of the Invention

The present invention is a computerized security system used to maintain the safe operation of aircraft. This computer system utilizes and interconnects to conventional systems and equipment to track aircraft, providing an Anti-Crash System with built in anti-tampering functions. If the flight is interrupted, the Anti-Crash System further comprises a means to remotely control the aircraft and to detect and avoid aircraft, buildings and geographies.

In the wake of the terrorist events occurring in the United States on Sep. 11, 2001, our government, the airlines, other institutions, both nationally and abroad, and the traveling public recognize the need for a security system to ensure the safety of air travel. Conventionally, aircraft are tracked by means of radar or other signals emitted from the aircraft to receivers at airports, air traffic control centers, and military bases. On Sep. 11, 2001, the signal was tampered with by human intervention, and the planes were lost until the moments of impact with the Twin Towers, the Pentagon and the field in Pennsylvania. Therefore, an onboard Anti-Crash System that provides an On-Demand-monitoring device is needed to constantly track the position of the aircraft during flight.

On Sep. 11, 2001, if the air control centers had been able to take control of the planes remotely or had an Anti-Crash System installed onboard the aircraft, the controllers could have steered the planes away from the Pentagon, the Twin Towers, and could have avoided the field crash in Pennsylvania.

During normal operation, a pilot is charged with setting the controls according to the filed flight plan before departure. The pilot is to maintain the course of the flight plan and only to deviate under the direction of the air traffic controllers. Under certain circumstances, the flight plan is deviated due to traffic or turbulence. Currently there is not a system to control the plane remotely if the captain becomes incapable of piloting the plane. There exists a need to establish a computer system for remotely piloting of the aircraft.

A need currently exists for an Anti-Crash System on aircraft that will prevent crashing into buildings. The aircraft that crashed into the Twin Towers and the Pentagon on Sep. 11, 2001 was not equipped with devices to keep them from crashing into buildings and populated areas. Therefore, a sensor system is needed to prevent airplanes from landing or crashing in highly populated areas or in other defined no-crash areas, as well as into the no-fly zones.

Additionally there is a need for anti-tamper technology. Current warning systems exist only to notify the pilot and/or air traffic controllers.

BRIEF SUMMARY OF INVENTION

The present invention is a combined unit of systems ensuring safe aircraft operation. The complete Security Aircraft Flight Equipment (SAFE) system 10 of the present invention is made up of components that use sealed navigational computer programs with anti-tamper functions.

The component parts of the present invention consist of an Anti-Crash System (ACS) 20, involving two sub-systems that operate to maintain object distances, such as negative Pole to negative Pole magnets trying to touch. If the Anti-Crash System (ACS) 20 is disabled the aircraft will not power up for departure until all systems are operating. The aircraft-to-aircraft system is the first of the two sub-systems; it is a fixed system, mounted where a terrorist cannot reach the equipment. The aircraft-to-building and building-to-aircraft system is the second of the two systems; buildings that have aircraft monitoring systems send a signal that repels the aircraft from hitting the structures. If the building device is tampered with, authorities will be contacted, given vital information of this event. An early warning device is installed in buildings/structures to signal a potential warning of aircraft invasion, possibly wired as part of a security alarm.

The second component, an Auto-Controlling and Piloting System (ACPS) 40, receives commands from the Anti-Crash System (ACS) 20, which overrides and takes over all flight controls of the aircraft by locking out terrorists and suicide pilots. These preliminary steps will allow the initiation of a Secondary Aircraft Controller System 60 described below, if necessary.

The third component is a Monitoring Device System (MDS) 30 that sends and receives video, audio, and critical information from the aircraft's flight support equipment. Along with runway monitoring devices, the building or structure monitoring devices, all information is automatically transferred to the Anti-Crash System (ACS) 20 for analyzing and action.

The fourth component, an Authorities' Security Aircraft Flight Equipment (ASAFE) computer 50, is securely integrated into the combined systems of all security aircraft flight equipment. Located within the airports, and proper authorities, such as the FAA, these On-Demand systems will allow for full National Security and air traffic safety.

The fifth component, the Secondary Aircraft Controller System (SACS) 60, upon security commands by FAA or FBI, etc., authorities, gives power for remote control of the distressed aircraft from the integrated Security Aircraft Flight Equipment (SAFE) systems. This provides safe retrieval of a distressed aircraft.

In short, the present invention includes the following embodiments described herein to improve flight security from terrorism or human error, as well as aircraft equipment deviating outside factory tolerances.

DETAILED DESCRIPTION OF THE INVENTION

Figure 1:
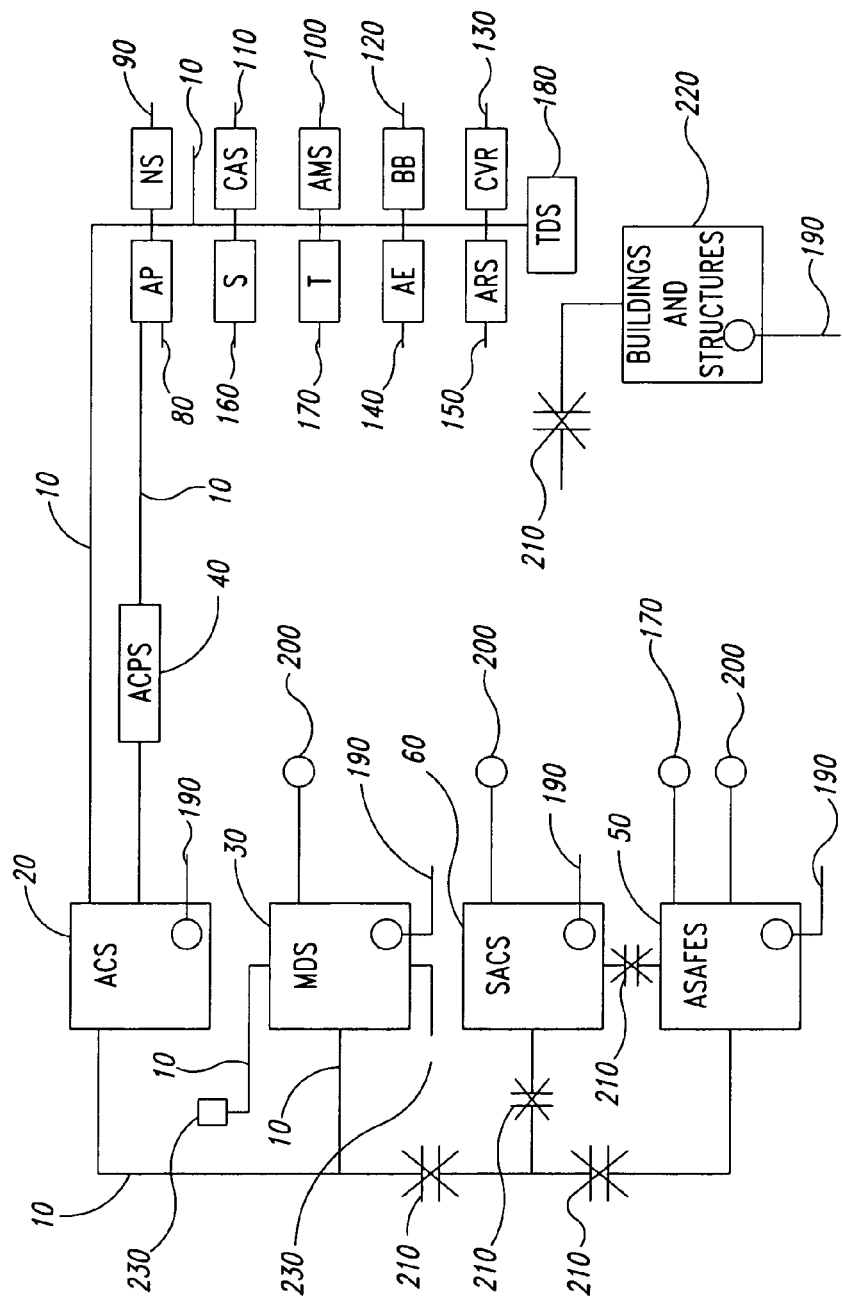
FIG. 1 shows an overview of the invention comprising various conventional aircraft related safety systems, programs, connectivity and their relation required for the present invention.

The present invention is further detailed below, and this detailed description includes an overview outline section and an explanation of the present invention applied to actual scenarios.

Aircraft System Interface

Electrical connections 12 tying all of the conventional systems to the "SAFE" system 10.

The Aircraft System Interface will allow the "SAFE" system 10 to act together with the primary aircraft, other aircraft, ground control, and designated security authorities. The scenarios noted within are both real life and predicted. These scenarios were taken into consideration when designing the "SAFE" system 10. The Aircraft System Interface will be listed in the following sections: Power Plants & Airframe, Electronics, and Mainframe.

Power Plants & Airframe
  A) Auto Pilot (AP) 80
    1) Variable/increased flight adjustment capabilities
    2) Increase of: thrust/pitch/yaw movements
  B) Collision Avoidance System (CAS) 110
    1) Outside input, such as transponder from buildings, other aircraft, etc.
    2) Onboard anti-collision radar
  C) Aircraft Mechanical System (AMS) 100
    1) Flight controls
    2) Power plants controls
  D) Aircraft Electrical Systems (AES) 140
    1) Power plant generators
    2) Emergency generator system
  E) Onboard, Air to Air Refueling (AAR) (not shown)
    1) Retractable, external refueling probe
  F) Expansion Capabilities
    1) For future contingencies, both hardware & software Electronics
  A) Aircraft Radio Systems (ARS) 150
    1) All communications systems, onboard and beyond aircraft
    2) Both audio visual to remote receivers
  B) Transponder (T) 170
    1) Sending unit for identification and location
  C) sensors (S) 160
    1) Instrumentation for monitoring engine characteristics
    2) Instrumentation for monitoring airframe characteristics
  D) Onboard Recording System (CVR) 130
    1) Collecting all voice & Video input, onboard
  E) Black Box (BB) 120
    1) Flight Data Collection
  F) Navigational Systems (NS) 90
  G) Topographical Analysis System (TAS) 180
    1) Feeds topographical data into the navigational system Security Aircraft Flight Equipment (SAFE)
  A) Anti-Crash System (ACS) 20
    1) aircraft to aircraft
    2) aircraft to building, building to aircraft
  B) Auto Controlling and Piloting System (ACPS) 40
  D) Monitoring Device System (MDS) 30
    1) aircraft
    2) runway
    3) structure(s)
  E) Authorities' Security Aircraft Flight Equipment (ASAFE) System 50
  F) Secondary Aircraft Controller System (SACS) 60
  Aircraft Systems Interface (Safe System) Main Frame The "Main Frame" component will have at least three areas of data collection and command outputs, along with room for expansion in the hardware and software. The "Main Frame" may be included in the Aircraft Systems through one or more file servers that interface with all onboard systems (Aircraft Systems Interface).
  A) Anti-Crash System 20
    1) Aircraft System Interface 12
    2) Auto Control and Piloting System 40
    3) Enhancement module (not shown)
  B) Security Interface
    1) Authorities Security Aircraft Flight Equipment Program 50
    2) Thumb Print Reader (not shown)
    3) Security Code Key Pad (not shown)
    4) Pilot Security Key (not shown)
    5) Monitoring Device System (MDS) 30, multiple sources, (i.e., audiovisual)
    6) Any additional Security devises or systems to be included at a future time
  C) Secondary Aircraft Controller System (SACS) 60
    1) Allows two ACS to interface, i.e., aircraft to aircraft remote flight capabilities Security Aircraft Flight Equipment and Technologies Aircraft Anti-Crash System (ACS) 20, Monitoring Device System (MDS) 30, Auto Controlling and Piloting System (ACPS) 40, software programs, solid-state computer, technologies, such as, PROM, ROM, etc. modem, monitor, eyepad, thumb scan, port dongle, pilot's personalized flight keys, transponders, global phone, sensors, cameras, lighted alarm buttons, flash card reader and writer unit (for mapping to back track), microphone, speakers Structure 220

(Building, Bridges, Monuments, etc.), Anti-Crash System (ACS) 20, Monitoring Device Systems (MDS) 30 software program, solid-state computer, technologies, such as, PROM, ROM, Etc.

modem, monitor, port dongle, transponder, global phone, sensors, cameras, optional warning horn Airports Anti-Crash System (ACS) 20, Monitoring Device System (MDS) 30, computer runway monitors: transponder, Authorities' Security Aircraft Flight Equipment (ASAFE.)

Anti-Crash System (ACS) 20, Monitoring Device System (MDS) 30, software program solid-state high end computer, technologies, i.e., PROM, ROM, etc.

Authorities' Security Aircraft Flight Equipment (ASAFE) computer Monitoring Device System (MDS) 30 software program, with ON-DEMAND Command Device also, network rights, solid-state computer, technologies, i.e., PROM, ROM, etc.

modem, monitor, keypad, thumb scan, port dongle, proprietary personalized key, transponder, global phone, microphone speakers, all units are supplied with an independent power backup if one is not already provided.

Secondary Aircraft Controller System (SACS) 60

Anti-Crash System (ACS) 20, Monitoring Device System (MDS) 30, Auto Controlling and Piloting System (ACPS) 40 software program, solid-state computer, technologies, such as, PROM, ROM, etc. modem, monitor, keypad, thumb scan, port dongle, pilot's personalized flight keys, transponder, global phone, sensors, cameras, lighted alarm buttons, flash card reader and writer unit (for mapping to backtrack). Microphone, speakers virtual reality ability and equipment, modem, monitor, control panel, keypad, thumb scan, port dongle, pilot's personalized flight keys, transponder, global phone, sensors, microphone, speakers.

Service Technicians: Service Technician dongle/key, programmed with a master license dedicated for servicing only.

Security Aircraft Flight Equipment (SAFE) system 10: Each aircraft comes with optional backup Security Aircraft Flight Equipment (SAFE) system 10 in place. The backup system has the same capabilities as the master system. While in idle its only function is to collect information. Due to any given malfunction, the backup Security Aircraft Flight Equipment (SAFE) system 10 would automatically activate. It would immediately advise appropriate personnel of a problem with the master backup Security Aircraft Flight Equipment (SAFE) system 10.

Anti-Crash System (ACS) 20: This system is active at all times; the functions are collecting, analyzing and processing data, as well as allocating and dispersing assigned duties to other portions or units of the Security Aircraft Flight Equipment (SAFE) system 10. The only time the Anti-Crash System (ACS) 20 would be in a shut down mode is for servicing. [Refer to the Service Technician section.] The Anti-Crash System (ACS) 20 is the component that utilizes the perimeters set by manufacturers, navigational technicians, authorities, crews etc. for the aircraft to follow. It is receiving data from onboard control systems and any other sensors (displays, gauges, selectors, indicators, and other apparatus, etc.). Sensors 160 can be added for the indication of excessive vibration and connected through the Security Aircraft Flight Equipment (SAFE) system 10. The Anti-Crash System (ACS) 20 identifies any fluctuation that is outside the manufacturer tolerances and safety specifications. By the emitting and receiving of signals the aircraft will identify the presence of other Anti-Crash System (ACS) 20 and Monitoring Device System (MSD) 30 apparatuses. This allows the aircraft to veer from solid objects, such as other planes, buildings, bridges, and monuments. Due to the settings of perimeters within the mapping program for designated no fly zone areas; an aircraft will not be able to fly into a protected environment. These areas are set for national security and flight safety.

The peripherals are external devices connected to the computer, (such as conventional keypad and thumb print scanners). For the security of the aircraft, concealed dongle keys are used for the Security Aircraft Flight Equipment System (SAFE) system 10 license only. A second dongle or chip key is necessary for the operation to initialize the aircraft for flight by the pilot. This is called a pilot's personalized flight key. This key will only be licensed and registered to the pilot, with thumb print identification programmed into the chip.

The Anti-Crash System (ACS) 20 copies all necessary information of the flight plan to a flash card. In case of an equipment malfunction caused by atmospheric disturbances, the aircraft has the ability to backtrack. This backtrack system is used by the Anti-Crash System (ACS) 20 and the Auto Controlling and Piloting System (ACPS) 40. These systems have usage of a backtracking card independently. Upon receiving a transmission from another aircraft through the Secondary Aircraft Controller System (SACS) 60, the Anti-Crash System (ACS) 20 will recognize and work simultaneously with an external Anti Crash System (ACS) 20 (i.e., chase aircraft). The Anti-Crash System (ACS) 20 will make the corrections and override manual piloting for safe flight, landing, and liftoff.

Each portion of the Security Aircraft Flight Equipment System (SAFE) system 10 receives the demands from the Anti-Crash System (ACS) 20, telling it what its job is. The Anti-Crash System ACS 20 has the capability to override or lock out the manual controls and/or existing Auto-Pilot (AP) 80. The Anti-Crash System (ACS) 20 interfacing with Auto Pilot (AP) 80 can recalibrate the aircraft for total computer jurisdiction. The computer part of the Auto Controlling and Piloting System (ACPS) 40 would have override capabilities, such as landing gear. The Anti Crash System (ACS) 20 will allow for the Auto Controlling and Piloting System (ACPS) 40 to take over control of the aircraft's flight systems for maneuverability. See Equipment Usage and Synopses Scenarios, especially 1 and 25.

Auto Controlling and Piloting System (ACPS) 40 makes corrections and overrides manual piloting for safe flight, landing, and lift-off because the Security Aircraft Flight Equipment (SAFE) 10 regulates it necessary. The pilot also can opt to use this provision. The Auto Controlling and Piloting System (ACPS) 40 is a device module that enhances the existing Auto Pilot 80. It is also controlled by the Anti-Crash System 20. The (ACPS) 40 is a device module that enhances the existing Auto Pilot 80. It is also controlled by the Anti-Crash System 20.

This portion of the Security Aircraft Flight Equipment System (SAFE) system 10 receives the demands from the Anti-Crash System (ACS) 20 telling it what its job is. This system has the power to override or lock out the manual controls and/or existing Autopilot (AP) 80, re-calibrating the aircraft for total computer jurisdiction. The computer part of the Auto Controlling and Piloting System (ACPS) 40 would have the control over the landing gear. This is allowing for the Auto Controlling and Piloting System (ACPS) 40 to take over control of the aircraft's flight systems, (landing gear, flaps, etc.).

The Auto Controlling and Piloting System (ACPS) 40 will be linked to all the controls for override protection, (1) to force a terrorist/pilot to relinquish command, and (2) for the Secondary Aircraft Controller System (SACS) 60 to override the aircraft, by acting harmoniously with the rest of the units in the Security Aircraft Flight Equipment (SAFE) system 10. Refer to Equipment Usage and Synopses Scenarios 3, 5, 12–15, and especially 21, 28, 39.

Monitoring Device System (MDS) 30: The Monitoring Device System (MDS) 30 has the programming with commands of On-Demand 230 live video and audio, these video and audio devices are not constantly recording. The Monitoring Device System (MDS) 30 includes peripherals to be activated in three ways: (1) automatically by the Anti-Crash System (ACS) 20, (2) manually by alarm devices and sensors 160, and (3) by appropriate authorities.

On the aircraft the On-Demand Monitoring Device System (MDS) 30 consists of cameras, audio speakers and receivers, phone, alarm devices and sensors. The aircraft is setup with several manual alarm devices in the fuselage and cockpit. The peripheral adapters for an aircraft Monitoring Device System (MDS) 30 work both ways in transmitting and receiving signals/data. First, the unit sends the vital information that the Anti-Crash System (ACS) 20 collected from the aircraft's flight support equipment. This includes registration information, longitude, latitude, altitude, compass heading, etc. Secondly, it retrieves data from the Structure Monitoring Unit and the runway Monitoring Devices. Thirdly, it sends and retrieves data from the Authorities Security Aircraft Flight Equipment (ASAFE) System 50 computer 190. (Reference number 190 represents computer programs or software. Reference number 200 represents speakers, cameras, microphones, and sensing equipment. Reference number 230 represents a peripheral, such as described above.)

The vital information accumulated by the Monitoring Device System (MDS) 30 is automatically transferred to the Anti-Crash System (ACS) 20 for analyzing. The Anti-Crash System (ACS) 20 will then systematically activate the appropriate systems. Refer to Equipment Usage and Synopses Scenarios ALL especially 3, 26, and 44.

Airport runway Monitoring Devices: These devices send signals through the Monitoring Device System (MDS) 30 to the Anti-Crash System (ACS) 20, allowing the Anti-Crash System (ACS) 20 to compensate the aircraft for all corrections necessary in order for it to make an accurate approach, landing, or takeoff. Refer to Equipment Usage and Synopses Scenarios 3, 6, and 7.

Referring next to the Authorities' Security Aircraft Flight Equipment (ASAFE) 50, the computer system 190 is developed for ground authorities such as FAA, Air Traffic Control, Airline company, FBI, etc., to help with National Security and air traffic flight safety. At any given time the appropriate authorities would have On-Demand live video and audio, both for transmitting and receiving signals, even if there is no apparent problem. The computer will receive and display all data (from multiple airplanes) at any given time. From this system, the proper authorities will be able to activate any particular aircraft's Monitoring Device System (MDS) 30, to collect the data and view activity on the aircraft. It also gives more support in verbal contact with the pilot. Navigational data is received and sent for approval.

Note: Potentials, through the Security Aircraft Flight Equipment System (SAFE) system 10 working with GPS and possible radar will allow airlines to monitor the location of their aircraft at all times (tracking device) Note: each Authorities' computer will be designed for each specific function. This is an existing computer technology. Refer to Equipment Usage and Synopses Scenarios 3, 4, 5, 9, and 46.

Secondary Aircraft Controller System (SACS) 60: The Secondary Aircraft Controller System (SACS) 60 equipment is energized by a specialized licensed key. After the implementation of the key, three codes are necessary from three separate organizations to activate the Secondary Aircraft Controller System (SACS) 60. Upon arriving to the distressed aircraft, the Secondary Aircraft Controller System (SACS) 60 emits codes to the Security Aircraft Flight Equipment System (SAFE) system 10, thereby identifying each other. After transmission is complete and approval has been documented, the Secondary Aircraft Controller System (SACS) 60 may take possession and control of the aircraft, through computer technology.

The Secondary Aircraft Controller System (SACS) 60 is a computer with peripheral attachments: simulator control panel, display monitor and cameras aboard a separate airplane within visual distance.

Note: The Secondary Aircraft Controller System (SACS) 60 pilot has vision and the controls comparable to Virtual Reality piloting, sitting and controlling the distressed aircraft. Refer to Equipment Usage and Synopses Scenarios 9, 12, 13, and 34.

Secondary Aircraft Fuel Tanker: The Anti-Crash System (ACS) 20 detects low fuel and it sends the Monitoring Device System (MDS) 30 a message to contact the proper authorities about the problem. At that time, the authorities can send up the Secondary Aircraft Fuel Tanker (SAFT) 60 to provide the necessary fuel or assistance. Once they are within a designated range, the two airplanes' Anti-Crash Systems (ACS) 20 and Monitoring Device Systems 30 work and maneuver together for completion of the refueling process and whatever task the Secondary Aircraft Fuel Tanker (SAFT) 60 was sent up to perform. Also as the Secondary Aircraft Fuel Tanker (SAFT) 60 approaches a distressed aircraft, due to a special license, the two Anti-Crash Systems (ACS) 20 identify and link together. This holds each aircraft at bay for precise tracking. This eliminates pilot error, therefore enhancing accuracy during refueling that is necessary in emergency operation. Refer to Equipment Usage and Synopses Scenarios 24.

The Security Aircraft Flight Equipment System (SAFE) 10 (Structures, Buildings, etc.): Only two systems are required for a structure to be completely protected by the Security Aircraft Flight Equipment (SAFE) System 10—the Anti-Crash System (ACS) 220 and the Monitoring Device System (MDS) 30. A power backup unit will be provided if not already existing within the structure.

Anti-Crash System (ACS) 220 Ground Structures: This Anti-Crash System (ACS) 220 prevents aircraft from crashing into ground structures such as buildings, bridges, and monuments. The Anti-Crash System (ACS) 220 beacons emit two independent perimeter signals. Refer to Equipment Usage and Synopses Scenarios 39, 41, and 42.

Monitoring Device System (MDS) 30 Ground Structures: The Monitoring Device System (MDS) 30 in a building is a computer with peripherals. The cameras, motion detectors/sensors are the peripherals connected to the computer. These are only for the security of the Security Aircraft Flight Equipment (SAFE) System 10. The telephone connections and warning alarms are to help in the safety of the community. It would be optional to connect to any existing security systems, if desired. Refer to Equipment Usage and Synopses Scenarios 39, 41, and 42.

Registration: ownership, registration number, year, make, model, and series, body type, Vin number, etc. Refer to Equipment Usage and Synopses Scenarios 31 and 47.

Service Technicians: The Service Technicians dongle/key is individually coded, that gives proprietary authorization for repairs and installation of the Security Aircraft Flight Equipment System (SAFE) 10. This will not commission the service technician the rights for aircraft flight status. Due to the need for high security, this would only allow a secured service technician to install any/all software perimeters and licenses, on all Security Aircraft Flight Equipment System (SAFE) 10 equipment. Refer to Equipment Usage and Synopses Scenario 48.

Presidential Override: This is a code that overrides everything EXCEPT the Anti-Crash System (ACS) 20. Refer to Equipment Usage and Synopses Scenarios 2 and 34.

Equipment Usage In Synopses Scenarios

The following synopses scenarios explain how the present invention interfaces with existing conventional aircraft systems to optimize the safe operation of an aircraft. In each scenario presented below, a problem has occurred with an aircraft. The present invention in conjunction with conventional aircraft components are explained as to how the situation can be avoided in the future utilizing the present invention.

1) SOMEONE TAMPERS WITH THE AIRCRAFT OPERATING SYSTEM WHILE ON THE GROUND. If someone has tampered with any part of the operating system or there is a malfunction in the operating system, then the Anti-Crash System (ACS) 20 will trigger a shutdown not allowing the turbines and/or the engines to function. This cannot be overridden by resetting the equipment. The Security Aircraft Flight Equipment (SAFE) system 10 work in conjunction with the onboard diagnostic process. In an event that a signal is sent notifying of a problem, it will disable the aircraft for flight. This will notify all necessary ground authorities of the situation through the Monitoring Device System (MDS) 30. The data sent will include the time and location of the problem in the administrative device management program. Reference: Actual Crash Document 12, 13, 20, 26, 27, 28, 31, 34, 36, 40, 42, 46, 52, 66, 69, 70, 73, 74, 76, and 78.

2) A PASSENGER ENTERS INTO THE AIRCRAFT FLIGHT DECK (COCKPIT) WHILE THE PLANE IS STILL ON THE GROUND. In the event of an unauthorized person entering into the flight deck (cockpit) while on the ground, the Monitoring Device System (MDS) 30 will be activated automatically by the Anti-Crash System (ACS) 20. This system will send pictures and data to designated parties. Now the Anti-Crash System (ACS) 20 would put the aircraft in a standby mode. In order to release the aircraft for flight, a multiple code by several independently located specified individuals must be entered. An example is using the pilot, airline security, FAA, FBI etc.; using as many codes as desired.

3) AIR TRAFFIC CONTROLLERS (ATC)/PILOT'S SITUATIONS. (Crashes and close calls) Here are some actual scenarios causing near misses or crashes, due to (ATC)/Pilot's error.

ATC:

1. Dispatched inadvertently for takeoff/landing on a runway that was closed or down for repair
2. Directing in and out bound aircraft onto the same runway
3. Directing multiple planes to the same vectors causing a mid-air crash
4. Aircraft impacts terrain after being given an improper vector by ATC
5. Authorized flight, descend below altitude causing mishaps Pilot's:

1. Ignoring ATC instructions
2. Ignoring warning signals and devices
4. Over correcting and inability to act quickly
3. Misinterpreted communication between ATC and pilot
5. They neglect to post a warning when they find a dangerous mechanical problem.

Note: The Federal Aviation of Administration, National Transportation Safety Board States, "Pilots are blamed in 37% of all serious airline accidents, while other persons, such as a mechanic or controller, are blamed in 39%". A description of more than 46,000 aviation accidents is located at www.ntsb.gov. More detailed lists are located at www.airdisaster.com and www.crashdatabase.com. The Authorities' Security Aircraft Flight Equipment (ASAFE) System in the Control Tower also has two additional programs, an airport mapping configuration, and a ground-plotting program. The runway Monitoring Devices System (MDS) 30 is also connected to the Security Aircraft Flight Equipment (SAFE) system 10. Airports utilizing these two programs, coupled with the complex marriage in the Security Aircraft Flight Equipment (SAFE) system 10 now will virtually eradicate the current close calls, and crashes caused by human error in departure and arrival, as well as in taxiing procedures. The capabilities of the program will now allow the Air Traffic Control Tower personnel (ATC) to input the data for a specific taxi course that the Captain must follow. It also allows them to monitor all ground movement of aircraft.

A direct link to any specific plane is made by the Security Aircraft Flight Equipment (SAFE) system 10, collecting pertinent data about the aircraft. The Anti-Crash System (ACS) 20 on the aircraft, as in flight, will identify each aircraft's location, and not allow aircraft to collide while on the ground during a taxi procedure. In addition, it will not allow two aircraft to enter the same runway on a departure and arrival situation, or enter each other's airspace.

Note: At the time of a mechanical malfunction, the proper authorities will be notified through the Monitoring Device System (MDS) 30. Reference: Actual Crash Document 23, 32, 34, 35, 37, 44, 48, 52, 53, 54, 55, 60, 61, 62, 63, 64, 65, 68, 71, 81, 82, and 84.

4) THE WRONG LAT./LONG. IS PLOTTED AND THE AIRCRAFT IS SET TO CRASH INTO A MOUNTAIN (course is plotted while still grounded) Let's say, a course is plotted and this course has an error in it, or a hijacker, or suicidal pilot attempts a crash course. FIRST, the Security Aircraft Flight Equipment (SAFE) system 10 recognize the data sent from the plotting equipment. If this would result in a collision, a warning alarm will sound. SECOND, The Anti-Crash System (ACS) 20 will not allow the aircraft to power up, until corrections are made in the plotted course. In this scenario, the Monitoring Device System (MDS) 30 will upon any of the above attempts, automatically alert ground authorities, FAA, etc. This will help to ensure greater success in the air traffic safety efforts. Reference: Actual Crash Document 3, 11, 30, 33, 48, 68, and 71.

5) AN INCORRECT COURSE IS PLOTTED IN THE AIR AND THE AIRCRAFT IS SET TO CRASH INTO A MOUNTAIN Let's say, a course is plotted and this course has an error in it, or a hijacker, or suicidal pilot attempts a crash course. FIRST, the Security Aircraft Flight Equipment (SAFE) system 10 recognize the data sent from the plotting equipment. If this would result in a collision, a warning alarm will sound. SECOND, The Anti-Crash Systems (ACS) 20 will not allow the aircraft to deviate from the original plotted course, until corrections are made in the new plotted course. In this scenario, the Monitoring Device System (MDS) 30 will, upon any of the above attempts, automatically alert ground authorities, FAA, etc. This will help to ensure greater success in the air traffic safety efforts. Reference: Actual Crash Document 3, 11, 30, 33, 48, 68, and 71.

6) A PILOT TRIES TO CRASH THE AIRCRAFT DURING LIFTOFF OR UPON LANDING This scenario brings to mind the act of pilot suicides or terrorist(s). The first thoughts are for the safety of the passengers and crewmembers; also saving the airplane.

Monitoring Device System (MDS) 30 components installed at the end of each airfield runways transmit signals for the use of lift off attempts and approach landings. To give you more detail of this event, data is sent from the Monitoring Devices on the runway to the computer in the plane. Telling the exact angle, (in degrees for line up) giving the exact length, (from the beginning to the end of the runway) so that the aircraft would not over shoot the runway. Also information of the altitude of the aircraft from the runway, so that the aircraft would not crash. The systems being linked will allow the data in the registration (Security Aircraft Flight Equipment (SAFE) 10 registration, see below) from any particular plane to be utilized. These systems work as one unit in sharing data. Such data would be of air speed, RPM and how much distance the aircraft needs for takeoff or land, etc.

NOTE: In the process of lift off, a pilot does not reach the speed necessary to lift off safely, the Anti-Crash System (ACS) 20 would do one of two things.

1: It would abort the liftoff by engaging the Auto Controlling and Piloting (ACPS) 40 portion of the system. This system would reverse the thrust and apply the brakes, bringing the plane to a safe stop. As this would occur, the Monitoring Device System (MDS) 30 on the aircraft will make connection with specified authorities on the ground.

2: The aircraft database check, "all is a go" but the pilot did not power up enough. The Anti-Crash System (ACS) 20 would, before reaching the point of no return, engage the Auto Controlling and Piloting System (ACPS) 40 portion of the system. It would power up and initiate lift off, notifying the ground authorities that there is a problem, so that the pilot can be contacted.

NOTE: In the process of landing: If the pilot "comes in too short", the Anti-Crash Systems (ACS) 20 will receive data sent from the runway Monitoring Device System (MDS) 30 located on a specified runway. The data sent tells the position of the aircraft in conjunction with the runway; angle in degrees, the altitude, air speed, distance of landing, etc. If the pilot does not fix his course to the proper approach, the Anti-Crash System (ACS) 20 will implement the Auto Controlling and Piloting System (ACPS) 40, to make necessary corrections.

NOTE: Upon landing: The pilot misjudges the runway and "comes in to long" (over shoots the runway). As we talked above, there is data sent from the runway Monitors Device System (MDS) 30 to the Anti-Crash System (ACS) 20, this will inform the pilot of an error in his approach. If the pilot does not correct the error, then the Auto Controlling and Piloting System (ACPS) 40 will come into action. The Security Aircraft Flight Equipment (SAFE) system 10 will gauge the situation, abort the landing, and power up the aircraft. The Auto Controlling and Piloting System (ACPS) 40 will go into a holding pattern.

NOTE: The pilot is on the wrong approach; His compass bearing doesn't line up with the runway. In this case the Anti-Crash System (ACS) 20 will activate the Auto Controlling and Piloting (ACPS) 40 portion of the system, by powering up the aircraft and entering into a holding pattern. Waiting for a command from an Air traffic controller (ATC).

NOTE: In the event that the aircraft is coming in out of improper plane (not level). The Anti-Crash System (ACS) 20 will read the data coming from the onboard deck equipment. Upon making connection with the Auto Controlling and Piloting System (ACPS) 40, the aircraft will make adjustment to compensate the aircraft to a level position. This adjustment would only be used in a landing procedure. Reference: Actual Crash Document 2, 5, 6, 10, 11, 15, 18, 24, 25, 26, 29, 30, 36, 37, 40, 41, 43, 45, 46, 48, 51, 65, 67, 72, and 84.

7) WHAT STOPS THE AIRCRAFT FROM CRASHING INTO THE AIRPORT BUILDINGS, TERMINALS, HANGERS, CONTROL TOWERS UPON LIFTOFF OR LANDING? (Example: possible suicide pilot or terrorist) Before the aircraft reaches the point of collision with any building(s) at an airport, the Anti-Crash System (ACS) 20 would power down the aircraft, thereby softening the collision or stopping it altogether. In the event that the aircraft has already taxied out onto the runway or an aircraft has landed onto the runway. The runway Monitoring Device System (MDS) 30 are in contact with the Anti-Crash System (ACS) 20; these systems would not allow the aircraft to waiver off course from the runway. The Auto Controlling and Piloting System (ACPS) 40 portion is activated through the same connection, as well as receiving information about the engines RPM. If the aircraft RPM are running too high for a safe landing, it will void the landing. If the aircraft RPM are running to low for takeoff, then it will abort takeoff or increase the thrust for takeoff. The aircraft will be forced to go into a holding pattern. Reference: Actual Crash Document 18 and 46.

8) A BOMB OR A BOMBER IS ON THE PLANE. In the event of a situation involving a bomb or bomber the aircraft has been fitted with silent alarm devices. These devices are located in several places throughout the fuselage area. This gives security to the flight attendants and pilots with the ease of accessibility to the alarm equipment. Once a silent alarm device has been triggered, it automatically locks in the Monitoring Device System (MDS) 30, alerting those in the flight deck (cockpit) and the appropriate authorities. The information transmitted advises them of a serious situation that is occurring on the aircraft. This will allow the flight attendants' hands to be free so they can assist other members in dealing with the situation. (Example; shoe bomber.) Reference: Actual Crash Document 16.

9) A HIJACKER, TERRORIST AND/OR UNAUTHORIZED PERSON GETS INTO THE AIRCRAFT FLIGHT DECK (COCKPIT) WHILE IN FLIGHT. In the event of an entry into the aircraft flight deck (cockpit), again the monitoring cameras would send pictures and data through the Monitoring Device System (MDS) 30 to the designated parties. This will allow the FBI and/or FAA to determine the severity of the existing situation, as well as, give them insight of how to respond. Their responses could include everything from ignoring the situation, allowing the pilot to handle the situation, or to take control of the aircraft. In the event that they would deem it necessary to implement one of the other parts of the Security Aircraft Flight Equipment (SAFE) system 10, they would need to use three individual parties, set up at independent locations to enter their separate codes. This enables them access to the Auto Controlling and Piloting System (ACPS) 40 and/or the Secondary Aircraft Controller System (SACS) 60.

Note: When necessary, the proper authorities will implement the Secondary Aircraft Controller System (SACS) 60. This system allows a security type aircraft that is within visual distance to take total control. They will pilot and land the aircraft that is in distress, only within set perimeters. This could include taking the aircraft to a designated area; i.e., a landing site that is less populated. Reference: Actual Crash Document 21, 22, 23, and 47.

10) AN INDIVIDUAL IS ALLOWED INTO THE FLIGHT DECK (COCKPIT) AREA, FOR WHATEVER REASON. THIS PERSON IS A HIJACKER OR TERRORIST AND THREATENS THE CAPTAIN. The Captain or employees in the flight deck (cockpit) will be able to set off a silent alarm. This device would start the Monitoring Device System (MDS) 30 and activate the Auto Controlling and Piloting System (ACPS) 40. The proper authorities will already be apprised of the situation, as it unfolds, (not after the fact), due to the implementation of these systems sending pertinent information. Simultaneously, when the silent alarm is set off lights will turn on in the fuselage, notifying all flight attendants of a possible situation.

At any time, the airline company/FAA/FBI or other designated authorities, in a united organized manner might consider it imperative to utilize any portion of the Security Aircraft Flight Equipment (SAFE) system 10. The power is given to them to engage the Auto Controlling and Piloting System (ACPS) 40. This is done by the use of three parties, individual codes. The Secondary Aircraft Controller System (SACS) 60, is also implemented with three party, individual codes. More is discussed about the Secondary Aircraft Controller System (SACS) 60 later. The Anti-Crash System (ACS) 20 is always in operation; this portion of the Security Aircraft Flight Equipment (SAFE) system 10 cannot be overridden by anyone. Reference: Actual Crash Document 22 and 47.

11) THE CAPTAIN IS DEAD AND TERRORIST(S) FORCES THE COPILOT IN POSITION TO PILOT THE AIRCRAFT. It is important to get the proper authorities involved as soon as possible by using a silent alarm device. This again allows an airline company, FAA and/or other groups to be aware of the terror occurring on the aircraft. The Monitoring Device System (MDS) 30 keeps them informed to the extent of how far the terrorist(s) have gone; it is done by sending both video and audio data. This data enables the authorities on the ground to take proper and necessary action to get control of the situation. This will commission them to exercise other portions of the Security Aircraft Flight Equipment (SAFE) system 10, such as Auto Controlling and Piloting System (ACPS) 40 even if the flight deck (cockpit) alarm device has been activated. It would be up to the proper authorities to elect this action if desired. Their options include utilizing the Auto Controlling and Piloting System (ACPS) 40, and the Secondary Aircraft Controller System (SACS) 60. This portion of the Security Aircraft Flight Equipment (SAFE) system 10 is mentioned in scenario number eleven. I would like to emphasize that the Anti-Crash System (ACS) 20 is always operating to hold the aircraft on a plotted flight plan.

Note: Within the Anti-Crash System (ACS) 20 perimeters, as an aircraft reaches the perimeter edge, the system itself initiates and locks in the Auto Controlling and Piloting System (ACPS) 40. By the two of these systems working hand and hand together, it will not allow a terrorist to deviate from the plotted flight plan. When approaching a designated landing field, the aircraft will merely go into a holding pattern.

Note: In this instance, authorities opted not to take control of an aircraft, during the plotted flight. For some reason they had, decided to wait until the aircraft's Anti-Crash System (ACS) 20 brought the aircraft to its destination. Reaching the destination the aircraft has gone into a holding pattern; at this time, authorities have determined to implement the Secondary Aircraft Controller System (SACS) 60. To do this, it is necessary three parties security codes be utilized by separate corp. entities, allowing remote piloting to take possession and to safely land the aircraft or redirect to a different landing strip.

12) ALL PILOTS ARE DEAD DUE TO ANY REASON. Without a Pilot the aircraft will deviate from its set course and when this occurs, the Anti-Crash System (ACS) 20 automatically engages the Monitoring Device System (MDS) 30 and the Auto Controlling and Piloting System (ACPS) 40. This system brings the aircraft back onto the formatted course, which allows the ground authorities to implement the Secondary Aircraft Controller System (SACS) 60. This is done with high security, multiple individual codes, operating from several independent locations. The reason for the high-security initiation of these codes is to regain control of the aircraft, allowing operation of remote piloting. In order for the Secondary Aircraft Controller System (SACS) 60 to work, a security aircraft must be within visual distance to take control of the aircraft. This allows them to land the aircraft in a safe controlled environment or to continue on to the designated flight plan. Reference: Actual Crash Document 49.

13) AN INDIVIDUAL TRIES TO TAKE THE AIRCRAFT OFF COURSE. The aircraft has a plotted course; this means the setting of the perimeters for the longitude, latitude, and altitude are already set. When an aircraft begins to leave this plotted flight plan, the Anti-Crash System (ACS) 20 will simultaneously engage the Monitoring Device System (MDS) 30 and the Auto Controlling and Piloting System (ACPS) 40. At this time, the Monitoring Device System (MDS) 30 will notify the Airline Company and also other necessary entities. With the activation of the Auto Controlling and Piloting System (ACPS) 40, the aircraft is brought back on course. It will hold this course until it reaches its destination. At the end of the established course, the aircraft goes into a holding pattern. This is buying time for the FAA and/or set departments to employ the necessary actions to activate the Secondary Aircraft Controller System (SACS) 60. This is begun by the input of a three party code from security individuals, all from independent locations. Again, by use of these security codes, the aircraft and passengers remain safe while control is allocated to the Secondary Aircraft Controller System (SACS) 60 to pilot by remote operation. The decision must then be made to continue with the planned course or re-plot a new course. Reference: Actual Crash Document 8, 11, 13, 14, 15, 21, 38, 39, and 47.

14) WHAT STOPS A PILOT OR A TERRORIST FROM PLOTTING A NEW COURSE? The aircraft will not acknowledge any plot changes without approval. In order to change course three codes are needed from separate entities in various locations. If these codes are not entered the Auto Controlling and Piloting System (ACPS) 40 will not comply and process the changes. If there is any tampering with or after three attempts of entry, the Auto Controlling and Piloting System (ACPS) 40 will immediately take over the piloting functions of the aircraft. It will hold the assigned course until it reaches the destination and then it will go into a holding flight pattern. The aircraft will remain in this pattern until the three party codes are entered, or the Secondary Aircraft Controller System (SACS) 60 is put into activation. Either of these being employed will then allow the aircraft to be retrieved. Reference: Actual Crash Document 8, 9, and 79.

15) A PERSON TRIES TO CRASH THE AIRCRAFT INTO THE GROUND WHILE AIRBORNE. If any person(s) tries to crash the aircraft into the ground, the Anti-Crash System (ACS) 20 will not allow the aircraft to go below a set altitude. At that time, the Monitoring Device System (MDS) 30 and the Auto Controlling Piloting System (ACPS) 40 will automatically engage to take control of the aircraft. The Monitoring Device System (MDS) 30 will again send notification to the appropriate authorities, giving them time to assess the situation and make the proper decision for the safety of all individuals. The Auto Controlling and Piloting System (ACPS) 40 that was employed simultaneously with the Monitoring Device System (MDS) 30 will bring the aircraft back onto the original flight plan. At this time if necessary, the FAA and/or other agencies can implement the Secondary Aircraft Controller System (SACS) 60, assigning remote piloting of the aircraft to a secondary craft. This aircraft is being put in place at close proximity. In order to disengage the Auto Controlling and Piloting System (ACPS) 40, it is necessary to use the high security multiple codes. This will allow FAA/Authorities, (if desired), to avert the aircraft to land in a more remote area. Reference: Actual Crash Document 13, 14, 15, 38, 47, 60, 61, and 80.

16) A PERSON TRIES TO CRASH AN AIR PLANE INTO ANOTHER AIR PLANE. Since the Anti-Crash System (ACS) 20 is continuously active, it will identify another aircraft coming into it's airspace. At this time the Anti-Crash System (ACS) 20 will activate the Auto Controlling and Piloting System (ACPS) 40 to elude the other aircraft that is on a collision course. After the incident has passed, the Auto Controlling and Piloting System (ACPS) 40 will bring the aircraft back onto the assigned course. The Monitoring Device System (MDS) 30 is also activated concurrently with the Auto Controlling and Piloting System (ACPS) 40. The Monitoring Device System (MDS) 30 will transmit data of the aircraft's longitude, latitude and altitude (this is for tracking purposes). This device is also transmitting video and audio data to the appropriate authorities on the ground. This transmission is an automatic response by the activation of the Monitoring Device System (MDS) 30. Reference: Actual Crash Document 39, 50, 62, 63, and 64.

17) SOMEONE TAMPERS WITH THE EXISTING ONBOARD SYSTEM WHILE IN THE AIR (Not the SAFE System). The system is linked into the controller devices BEFORE they reach the control panel. (The only part of the Security Aircraft Flight Equipment (SAFE) system 10 that is accessible by a person while in flight is the keypad and thumb scan device, alarm devices and cameras.) The control panel sends signals to the Security Aircraft Flight Equipment (SAFE) system 10, which reads the circuit loop. In the event that the wires are cut or tampered with at the control panel, the Security Aircraft Flight Equipment (SAFE) system 10 identifies a break in the circuit and it will immediately activate the Auto Controlling and Piloting System (ACPS) 40 and the Monitoring Device System (MDS) 30. The Auto Controlling and Piloting System (ACPS) 40 will put the craft on autopilot, and hold the set course. The Monitoring Device System (MDS) 30 allows the proper authorities to be apprised of the situation. This will notify them of which portion the aircraft control system has been tampered with or what has developed a malfunction. It is up to the authorities to decide what to do. They can give control back to the pilot if they wish, or to take control themselves through implementing the Secondary Aircraft Controller System (SACS) 60. Refer to the Secondary Aircraft Controller System (SACS) 60 information.

NOTE: If desired a reader screen maybe installed within the flight deck (cockpit) area. This will receive the information identifying the equipment malfunction. With this screen, it allows the pilot to know where the problem has occurred and to possibly correct the problem. With the ground's personnel having full knowledge of the situation they can offer necessary assistance by walking a person through temporary repair of the component. Reference: Actual Crash Document 14, 38, and 71.

18) WHAT STOPS SOMEONE FROM ATTEMPTING TO SHUT DOWN THE ENGINES WHILE IN THE AIR? The existing system would have to be wired through the Security Aircraft Flight Equipment (SAFE) system 10, which would not allow any type of shut down while the aircraft RPM are above an idle. Upon any attempt of tampering, the Anti-Crash System (ACS) 20 will engage the Auto Controlling and Piloting System (ACPS) 40 and lock out any other efforts to shut down the aircraft. In case of an emergency while in flight, such as the need to shut down a motor, the Security Aircraft Flight Equipment (SAFE) system 10 would already identify this emergency and make an allowance.

Note: Identification is made through the existing safety equipment that is already operational on the aircraft or the Security Aircraft Flight Equipment (SAFE) system 10 can institute the necessary sensors if desired by aircraft purchaser.

19) WHAT HAPPENS IF THE PILOT GETS DISORIENTED? (i.e., spatial disorientation). In this particular case, the pilot becomes disoriented for whatever reason. The aircraft deviates from the assigned course. The Anti-Crash System (ACS) 20 identifies that there is a problem, immediately directing signaling the Auto Controlling and Piloting System (ACPS) 40 to maneuver the aircraft back to the appropriate course. At the same time the Monitoring Device System (MDS) 30 immediately participates and sends data to the appropriate authorities. Automatically, the authorities will have access to audio and video information. The data will include the aircraft location and vitals (such as longitude, latitude, altitude, engine conditions, fuel level, etc.) This will assist the authorities to make an educated determination as to what their options are. If the authorities deem it necessary, they can arrange to engage in the Secondary Aircraft Controller System (SACS) 60. Once this system has been implemented, the authorities may re-plot a course to safely bring the aircraft to a less populated airstrip. Reference: Actual Crash Document 56 and 70.

20) THE PILOT IS LOST DUE TO STORM, ETC. (Bermuda triangle). The Security Aircraft Flight Equipment (SAFE) system 10 would record the path that the aircraft had traveled. The tracking system would hold all essential information, such as altitude, longitude, latitude, airspeed, etc. This would allow for the airplane to back track to a location where the pilot would be able to identify and resume control of the aircraft. Reference: Actual Crash Document 19.

21) WHAT HAPPENS DURING SEVERE ATMOSPHERIC DISTURBANCES? If the turbulence becomes beyond human capabilities to maneuver in, and the pilot is unable to keep the aircraft within the set perimeters, the Auto Controlling and Piloting System (ACPS) 40 will commence and bring the craft back on course. The pilot also has the option to engage the Auto Controlling and Piloting System (ACPS) 40 at any time.

NOTE: If the proper sensors are put in place the system could also identify excessive vibrations in areas that in the past have caused airplane crashes (engine areas, wing, tail, stabilizers, etc.). Reference: Actual Crash Document 19 and 20.

22) THE WEATHER IS SO SEVERE THE PILOT CANNOT MANEUVER THE AIRCRAFT. Upon the aircraft leaving the programmed flight pattern, the Monitoring Device System (MDS) 30 will automatically, alert the authorities on the ground that the aircraft or pilot maybe having difficulties. The information transmitted would be video and audio, as well as other data to determine the cause of why the aircraft is having problems staying within the designated pattern. Within the data sent is also the location of the aircraft, and the identification of the aircraft registration. Simultaneously, the Monitoring Device System (MDS) 30 and the Auto Controlling and Piloting System (ACPS) 40 are activated by the Anti-Crash System (ACS) 20. This system will enhance the maneuverability of the aircraft beyond human capability, due to the computer having quicker reaction time to changes in conditions surrounding the aircraft. This eradicates the documented 95% of human error involving airplane crashes. The Auto Controlling and Piloting System (ACPS) 40 already has a pre-plotted course to fine tune the direction of the aircraft, keeping this plane on this course. These systems continue monitoring, adjusting course, and notifying ground control individuals. Once the aircraft is out of the severe weather situation, the company's pilot can activate his personal code and thumb scan to resume piloting the aircraft again. Reference: Actual Crash Document 10, 18, 45, 70, and 72.

23) A HIJACKER TRIES TO CRASH AN AIRPLANE BY RUNNING IT OUT OF FUEL. The Anti-Crash System (ACS) 20 will analyze the functions of the aircraft. If any of the control panel devices get outside of the minimum standards set by the manufacturer, the Monitoring Device System (MDS) 30 will alert pilots and also automatically notify authorities and/or individuals in charge. This will allow the ground authorities to identify a potential situation such as low fuel levels, low fuel line pressures, low oil pressures, or any abnormalities of existing onboard systems. With the connection between the Anti-Crash System (ACS) 20 and the Monitoring Device System (MDS) 30 both pilot(s) and authorities can make all the calculations necessary to determine the best action necessary for the safety of the passengers and crew members. They might determine to bring the aircraft to a closer airfield. They also have the choice of using the Secondary Aircraft Controller System (SACS) 60 by entering the multiple-code process. This portion of the system gives them control of the aircraft. For the Anti-Crash System (ACS) 20 to function the operators would be required to initiate an alternative course with a final destination. (They would no longer be depending on any pilot in the distressed aircraft). Reference: Actual Crash Document 22, 43, and 45.

24) WHAT ABOUT IN-AIR REFUELING? CAN IT BE DONE WITH THE ANTI-CRASH SYSTEMS (ACS)? In the case of refueling, we are setting up a safety device so that two things occur: 1) the two Anti-Crash Systems (ACS) 20 would link. These systems will make the adjustments and corrections to hold the aircraft parallel and equal with the in-flight fuel tanker 2) the aircraft would be brought into a designated safe distance for refueling. Reference: Actual Crash Document 59.

25) ANOTHER AIRCRAFT DOES NOT HAVE THE ANTI-CRASH SYSTEM (ACS) 20 ONBOARD AND TRIES TO INTRUDE INTO THE SAME AIRSPACE (note: plane to plane). The Anti-Crash Systems (ACS) 20 identifies another aircraft through the radar controller. The system will implement the Monitoring Device System (MDS) 30. This device sends a signal to the aircraft asking for identification. It also sends data giving the approximate location of the other craft to authorities on the ground. If this other aircraft becomes to close the Anti-Crash System (ACS) 20 will maneuver away from the pushing aircraft, however, it will return to its designated course through the Auto Controlling and Piloting System (ACPS) 40.

26) WHAT IF AN AIRCRAFT DOES NOT IDENTIFY ITSELF? The Security Aircraft Flight Equipment (SAFE) system 10, through the Monitoring Device System (MDS) 30, sends data notifying the proper authorities of an unidentified aircraft in the area. Reference: Actual Crash Document 7.

27) WHAT KEEPS ANOTHER AIRCRAFT FROM FORCING THE AIRCRAFT TO AN UNWANTED AREA? (After it is on autopilot) In detection of another aircraft in the set airspace, the Monitoring Device System (MDS) 30 notifies the authorities by sending data. Information is coming in from the radar, GPS, and tracking mechanisms, etc. into the Anti-Crash System (ACS) 20. It will then take all this information and activate the Auto Controlling and Piloting System (ACPS) 40. This system will work in eluding any efforts in manipulating the aircraft off the assigned course. It will always rebound back to its pre-designated course.

28) WHAT STOPS AN AIRCRAFT FROM GETTING INTO ANOTHER AIRCRAFT'S JET STREAM (Wake Turbulence)? The Security Aircraft Flight Equipment (SAFE) system 10 will not allow this to happen. Using the Anti-Crash System (ACS) 20 and Auto Controlling and Piloting System (ACPS) 40 perimeters of airspace are set up per aircraft. These perimeters are pre-determined for flight safety. Each aircraft upon entering this designated airspace would deviate away from each other, not allowing either aircraft to become too close, disrupting the airflow beyond a reasonable tolerance. Reference: Actual Crash Document 1 and 85.

29) WHAT IF THE AIRCRAFT NEEDS TO BE REROUTED TO ANOTHER AIRPORT? In this instance, the pilot would need to get confirmation to re-plot to an alternative destination. Upon the new course being correct and acceptable, contact with the authorities on the ground would have to implement the multiple-code process to finalize the adjusted course. Again, these are the three party codes from three separate locations, to heighten air-flight security in event of a terrorist threat. Reference: Actual Crash Document 52.

30) IN CASE OF AN EMERGENCY THE AIR PLANE NEEDS TO RETURN TO THE AIRPORT. Not a problem as long as the plane stays within the perimeters plotted according to a return plan.

31) A COMMERCIAL FLIGHT PLOTS A COURSE OVER FOREIGN AIRSPACE. The Security Aircraft Flight Equipment (SAFE) system 10 on the plane will simultaneously alert and identify its registration to proper authorities in both countries. This will allow both countries to have the important information for diplomatic affairs if necessary in solving the airspace situation peacefully. Reference: Actual Crash Document 7, 75, and 83.

32) AN INDIVIDUAL OR GROUP OF INDIVIDUALS BECOMES A THREAT IN THE FUSELAGE AREAS. A member of the crew has the accessibility to the silent alarm devices which are installed in several areas throughout the aircraft. These alarm devices will notify other members of the crew, including members in the flight deck (cockpit) area, alerting them of a potential problem occurring on the aircraft. At the same time, the alarm device initiates the Monitoring Device System (MDS) 30. Now that the appropriate authorities are aware, they can view and analyze the events that are taking place on the aircraft. This will enable them to determine the necessary actions to employ. Their choice might be to contact the Captain, with the decision to implement the Security Aircraft Flight Equipment (SAFE) system 10 three-code process. Reference: Actual Crash Document 4, 16, and 21.

33) WE THINK NO ONE IS ALIVE ON THE AIRCRAFT; WE NEED TO BRING IT DOWN. Let's say a possible terrorist sets liquid or gas toxins in the airways of the aircraft; this has immobilized individuals. The Anti-Crash System (ACS) 20 would go in effect when the airplane is not being held into its flight perimeters. It would activate the Auto Controlling and Piloting System (ACPS) 40 to take over the controls; it will bring the aircraft back on course and hold the charted course. The Monitoring Device System (MDS) 30 is also implemented at the same time. It sends video data from the flight deck (cockpit) area, informing the authorities no one is awake or has their faculties in order to fly the aircraft. These videos also are of the walkways in the fuselage area, allowing the authorities to be totally aware of the situation. The audio data sent has not detected any sound in this case. With the Monitoring Device System (MDS) 30 operating it gives the authorities on the ground necessary data to determine what course they need to take. They have the option of applying the Secondary Aircraft Controller System (SACS) 60. This allows them to retrieve the aircraft and bring it into an airfield. If necessary, they can divert it to a secured location.

34) WHAT ABOUT THE POSSIBILITY OF HACKING OR DEFLECTION DURING REMOTE PILOTING, WHEN THE SECONDARY AIRCRAFT CONTROLLER SYSTEM (SACS) 60 IS IN EFFECT. The secondary aircraft that will be controlling the first aircraft has to be within a specified distance from the first aircraft. The two controllers of the systems must make a connection by using the codes and the security key. If they opt to make a course correction it must be accepted and verified by secured authorities.

Note: The Security Aircraft Flight Equipment (SAFE) system 10 allows for the use of a single party code for total override of the aircraft (remember now, the Anti-Crash System (ACS) 20 portion of the Security Aircraft Flight Equipment (SAFE) systems CANNOT be disabled). This code would come from the National Security Department (such as a presidential override). This single party code would be utilized in the event that there is a failure in activation of the other codes due to a hijacking.

A single party code for total override of the aircraft for Secondary Aircraft control in the event the other codes are being deflected or not activating them because of a hijacker.

This code would come from the National Security Department, such as a presidential override. This override code must be implemented from a secondary aircraft that is set at a designated distance.

35) THERE IS AN ELECTRICAL POWER OUTAGE ONBOARD THE AIRCRAFT (Not applicable upon an engine failure). In the event of an electrical power outage, the Security Aircraft Flight Equipment (SAFE) system 10 would not be effected since it would be wired through a separate breaker panel. The equipment is connected to the existing systems of the aircraft, so that it receives data from all of its components.

When a circuit loop is broken, it cannot repair anything. It will, through the Monitor Device System (MDS) 30, send data to the ground telling them of a problem, providing critical flight information (i.e., longitude, latitude, etc.). The ground control can then "talk the pilot through", or allow them the option to use other parts of the system Auto Controlling and Piloting System (ACPS) 40, or Secondary Aircraft Controller System (SACS) 60. Any questions on what these systems are, please refer to Security Aircraft Flight Equipment System (SAFE) system 10 document information Reference: Actual Crash Document 57 and 58.

36) WHAT IF THE AIRCRAFT'S (SAFE) SYSTEM MALFUNCTIONS? In any given system, there lies the possibility of malfunction. Malfunction of the Security Aircraft Flight Equipment (SAFE) system 10 does not affect the operation of the existing systems on the aircraft. With the equipment's design on any aircraft, it operates independently from the aircraft system. To limit the loss of security due to any given malfunction, the system uses independently powered hardware. There is an equipment option to install a second Security Aircraft Flight Equipment (SAFE) system 10 in any given aircraft (see document information, sub-heading: Backup System). The Security Aircraft Flight Equipment (SAFE) system 10 is linked with the existing system to receive data in order to perform it's own duties. The Monitoring Device System (MDS) 30 and Anti-Crash System (ACS) 20 are designed to notify proper authorities of any problem in any sectors. This again does not affect other portions of the Security Aircraft Flight Equipment (SAFE) system 10, because its units are independently connected to the system.

The aircraft's existing computers use various programs in informing topographically where their location is in conjunction with the ground. Using these, the Security Aircraft Flight Equipment (SAFE) system 10 compare coordinates with the data from the plotting equipment before take-off. If a plotted course is going to cause a collision, an alarm will sound and a light will flash on the control panel indicating that this is an inappropriate course. The pilot will have to make the corrections in order for the aircraft engine and/or in some cases the turbines to power up.

37) WHAT HAPPENS IF AIRCRAFT LOSES AIR PRESSURE? The Security Aircraft Flight Equipment (SAFE) system 10 would engage the Monitoring Device System (MDS) 30 that would be receiving data from the sensors of the aircraft. It will notify the pilot of a problem, as well as enlighten the proper authorities on the ground. Reference: Actual Crash Document 17 and 77.

38) WHAT IF THE PILOT IS A TERRORIST? During takeoff and flight, NO pilot can take the plane outside of the perimeters of a plotted course. The course can only be changed upon from the proper authorities on the ground. At this time then other security portions of the system would need to be implemented. Reference: Actual Crash Document 8, 9, 38, and 39.

39) A PERSON TRIES TO CRASH THE AIRPLANE INTO A BUILDING, BRIDGE OR OTHER OBJECT. Using this scenario because of what occurred on Sep. 11, 2001. The structure Anti-Crash System, such as the Building Anti-Crash System 220, would be used. This system has two separate groups of fixed perimeters encompassing the structure. 1) Set of perimeters marks an area for the program to send a warning signal to the pilot, letting him know that he is approaching into a no fly zone area. 2) Set of perimeters marks an area for the program to send a signal to the aircraft's Anti-Crash System (ACS) 20. Upon receiving, the signal the aircraft's Anti-Crash System (ACS) 20 will immediately initiate the Auto Controlling and Piloting System (ACPS) 40. In the event that the pilot or terrorist elect to ignore the warning and enter into the no fly zone area, the Auto Controlling and Piloting System (ACPS) 40 averts the aircraft outside of the protected air zone and brings it back on course. In order for an individual to take over the controls after the Auto Controlling and Piloting System (ACPS) 40 that have been activated, there is a three-stage process to be completed. This three-stage process is 1) a commissioned pilot must enter his personal code, and thumb print. 2) He must receive another code for entry; this is from the airline company security or designated authorities. 3) There would yet be another security code that would need to be entered to give him control of the aircraft (could be from the offices of the FAA, FBI, or Airline security). In the event that the pilot does not receive or does not enter the last two codes, then the aircraft will continue on the plotted assigned course. At the end of the flight plan, it will continue in a holding pattern until someone takes over the aircraft. This can be done either by entering the codes needed or by employing the Secondary Aircraft Controller System (SACS) 60. Multiple individuals also secure the last system through multiple codes. By implementing the Secondary Aircraft Controller System (SACS) 60, it relinquishes the restrained aircraft to be piloted by remote control. This will allow landing of the aircraft at its designated airfield or divert it to a secured location. The Monitoring Device System (MDS) 30 simultaneously will participate by informing all appropriate authorities. It will send vital information that allows them to make an educated and precise decision in this event. This essential information is through video, audio and additional data that identifies the aircraft. This contains the position of an aircraft, as well as the status of the fuel levels, fuel line pressures, R.P.M., onboard controls, etc.

Note: Another object of the system is to allow proper authorities (such as, Police Dept., Fire Dept., local authorities) notice BEFORE an attempted disaster strikes. It will not allow the aircraft to hit a building, bridge or object, providing the structure has the Anti-Crash System on it. This can also be linked into an alarm system so that an evacuation process can be implemented; this is allocating precious moments in the event that there could be a possibility of other types of an attack.

LET'S CHANGE THE HISTORY OF SEPTEMBER 11, 2001 BY USING THE SECURITY AIRCRAFT FLIGHT EQUIPMENT (SAFE) system 10. This example was taken from the Sep. 11, 2001 event. On this day the aircraft that struck the twin towers did not have any form of Anti-Crash System (ACS) 20 onboard, neither did the twin towers have any form of an alarm or anti warning device installed Anti-Crash System (ACS) 20. Now lets change the 2001 event. Before the crash there was a system installed on the building, the developed Security Aircraft Flight Equipment (SAFE) system 10. This is an Anti-Crash System (ACS) 20 and early warning device; it warns of an aircraft approaching the building's airspace. As the alarms sound of an air raid, this gives the occupants precious moments for evacuation (this is BEFORE the building is struck). As soon as the aircraft reaches the no fly zone area of the building, data is sent to authorities (fire departments, police departments and necessary officials) giving pertinent information.

Let's add the Anti-Crash System (ACS) 20 to the aircraft as well. The warning devices in the building emit signals that broadcast distance and height perimeters to the aircraft Anti-Crash System (ACS) 20. With this information to the Anti-Crash System (ACS) 20 it will engage the Auto Controlling and Piloting System (ACPS) 40 portion of the Security Aircraft Flight Equipment (SAFE) system 10 to divert the aircraft from the twin towers airspace. Locking out the pilot's control of the aircraft, it will not allow the pilot to regain control for a suicide terrorist attack. The Monitoring Device System (MDS) 30 would simultaneously activate and notify the necessary authorities (FAA/FBI). This notification is audio and video data from inside the aircraft and vital information about the aircraft (location, registration, etc.). Since the pilot is a terrorist, it is important for the authorities to take control of the aircraft. Approval is given by entering a three party security code from independent locations, allowing control by remote access from a secured secondary aircraft. By implementing this system, authorized individuals will be able to chart a new course if desired.

Note: See the Secondary Aircraft Controller System (SACS) 60 portion under the Security Aircraft Flight Equipment (SAFE) system 10 document information. Reference: Actual Crash Document 8, 9, and 79.

40) SOMEONE TAMPERS WITH A BUILDING OR OTHER STRUCTURE'S SAFETY SYSTEM EQUIPMENT. The system is connected to a silent alarm unit, alerting authorities of the attempted efforts in tampering with the Buildings Anti-Crash System (BACS) 220. The Building Anti-Crash System (BACS) 220 apparatus is connected to its own Monitoring Device System (MDS) 30; this device will send video and audio data to the police in identifying the perpetrators.

As the police respond to the incident, the Safety Aircraft Flight Equipment (SAFE) system 10 technical department will also be contacted to correct any damages that may have occurred to the system.

Note: See the Monitoring Device System (MDS) 30 on structures portion under the Safety Aircraft Flight Equipment (SAFE) system 10 document information.

41) THERE IS A POWER OUTAGE IN A BUILDING OR ON A BRIDGE, DUE TO ANY REASON INCLUDING SABOTAGE. The system remains fully operational in a power outage situation. It will be connected to the existing emergency power source. In the event that the building lacks an emergency power source, the Security Aircraft Flight Equipment (SAFE) system 10 would be supplied with an emergency power backup. These Security Aircraft Flight Equipment (SAFE) system 10 would be isolated in a secure location within the structure.

42) WHAT IF THE STRUCTURE SECURITY AIRCRAFT FLIGHT EQUIPMENT (SAFE) SYSTEM MALFUNCTIONS? In any given system there lies the possibility of malfunction. Each unit of the Security Aircraft Flight Equipment (SAFE) system 10 is independently wired to the building or structure. These two portions of the system: the Anti-Crash System (ACS) 20 and monitoring Device (MDS) 30 apparatus are connected through a complex marriage. Each of these units has a backup support system. Upon one of the portions malfunctioning, the backup system would activate still giving protection, also, notifying the building authorities and authorized service technicians of the malfunction.

Note: This will not affect any of the assisting alarms that are wired into the structure for security or fire systems.

43) WHAT IF SOMEONE DOES SUCCEED IN REMOVING ANY PART OF THE SECURITY AIRCRAFT FLIGHT EQUIPMENT (SAFE) system 10? On the ground, the system shuts down the aircraft, disabling it, just like if you take the computer from an automobile. The automobile would no longer operate, same with the aircraft could no longer fire up. All the facets of The Anti Crash System (ACS) 20 need to be in place and active, in order for the aircraft to be back in service.

In the air, all sectors of the Anti Crash System (ACS) 20 computer components are not accessible.

Again in any of these instances the Monitoring Device System (MDS) 30 would give attention to the proper authorities.

44) THE MONITORING DEVICES ARE TAMPERED WITH. The Monitoring Device System (MDS) 30 is linked to the brain of the operation, the Anti-Crash System (ACS) 20. When any part of the system (devices, wiring, camera's or sensors) is altered or the power changes, the Anti-Crash System (ACS) 20 engages the Monitoring Device System (MDS) 30 and contacts the authorities. The police and the security department will be notified through the silent alarm unit. In the Security Aircraft Flight Equipment (SAFE) system 10, all of the external components are individually connected through a complex marriage. When one is disrupted, it does not affect the performance of the other portions of the Security Aircraft Flight Equipment (SAFE) System 10.

The FAA would be immediately contacted through the Monitoring Device System (MDS) 30 with video and data from the Security Aircraft Flight Equipment (SAFE) 10 systems. This would not affect the functionality of the other cameras or alarm buttons since they are individually wired.

45) SOMEONE DAMAGES OR DISABLES THE KEYPAD AND/OR THUMB SCAN UNIT. In the event that these input devices are damaged the Security Aircraft Flight Equipment (SAFE) system 10 automatically takes over. All the portions of this system start simultaneously. The monitoring Device (MDS) 30 portion notifies ground personnel and/or authorities that tampering or damage to the aircraft has developed. Through this data they will be able to determine where the problem has occurred. Utilizing the video and monitoring (MDS) portion of this system they will be able to see who is in control on the aircraft. The Auto Controlling and Piloting System (ACPS) 40 have also been implemented at this same time, so the aircraft is being kept on the designated course. This is allowing the authorities to put in action the Secondary Aircraft Controller System (SACS) 60 if necessary, or relinquish the controls of the aircraft to the Captain through a three party code process.

46) WHAT IF THE HIJACKER BREACHES SECURITY AND ACCESSES THE CODES? The Anti-Crash System (ACS) 20 portion of the system Security Aircraft Flight Equipment (SAFE) 10, can not be coded out to shut down. The Hijacker cannot take the aircraft on a course endangering the passengers. The hijacker also would not be able to stop the implementation of the Secondary Aircraft Controller System (SACS) 60. The authorities on the ground have the option to engage the Monitoring Device System (MDS) 30 "at will", collecting information from the aircraft (identification, location, etc.) as well as audio and video data from within the flight deck (cockpit) and fuselage.

Note: Administrative rights can be assigned in many different combinations, allowing for limited access in designated programs within the Security Aircraft Flight Equipment (SAFE) system 10

47) WHAT ABOUT CODES BEING HACKED? This system is designed with checks and balances. We have put in for security reasons a three party code arrangement and using three totally separate locations, as well as, different facets of the industry such as airline companies, FAA, FBI, etc. These codes use not only numbers but also letters and characters as well using an encrypted key on all systems. For the use of identity, the key is on a short-term registration license. With the application of these encrypted key codes listed above, a live thumbprint is also required.

NOTE: Sensed body temperature or pulse scan.

48) WHAT ABOUT COMPUTER HACKING? The Security Aircraft Flight Equipment (SAFE) system 10 is protected by using a concealed dongle key, as well as an encrypted pilot dongle or chip key that is used in connection with the thumb scan. Without the operation of both of these, the system will not allow the aircraft to fly.

NOTE: The concealed dongle is the Security Aircraft Flight Equipment (SAFE) system 10 license key. The other dongle key is the pilot's personal key, also licensed. Even in event of a lost or stolen pilot's key, the Security Aircraft Flight Equipment (SAFE) system 10 will not identify an improper user or pilot.

The concealed dongle license key is located in a different location on the aircraft or structure and possible thumb scan programmed within this key chip.

A proprietary master dongle key is for service technicians only. This will only allow them to service the equipment; it will not allow them licensed rights to operate the aircraft.

49) WHAT ABOUT MAGNETIC DISTURBANCES? The solid-state equipment, i.e., ROMS and PROMS, etc. chips are not affected by magnets.

ACTUAL CRASH DOCUMENT

1. Date: May 30, 1972 Location: Dallas/Ft. Worth, Tex. Airline: Delta Air Lines Aircraft: Douglas DC-9-14 Registration: N3305L Fatalities/No. Aboard: 4:4 Details: While practicing touch and go landing the aircraft crashed after getting caught in the wake turbulence of a DC-10.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system for protecting aircraft operation at all times while an aircraft is in service, the aircraft having a pilot-operated control system to operate aircraft flight and taxi controls and an on-board autopilot coupled to the control system to automatically operate the aircraft flight and taxi controls, the system for protecting aircraft operation comprising:

an anti-crash system on the aircraft that automatically and without human intervention transmits commands to prevent the aircraft from crashing into the ground and into objects on the ground and in the air;

an auto-controlling and piloting system on the aircraft that receives the commands from the anti-crash system and is configured to prevent control by the pilot-operated control system and the on-board autopilot, the auto-controlling and piloting system overriding the pilot-operated control system and the autopilot to control movement of the aircraft on the ground and in the air;

a monitoring device system that monitors aircraft operation at all times while the aircraft is in service, the monitoring device system communicating with said anti-crash system; and a secondary aircraft controller system on board the aircraft and coupled to the auto-controlling and piloting system for controlling the aircraft flight and taxi controls independent of the pilot-operated controls and the on-board autopilot.

2. The system of claim 1, further comprising an authorities security aircraft flight equipment system remote from the aircraft communicating with the anti-crash system and the auto-controlling and piloting system and the monitoring system.

3. The system of claim 2, wherein the anti-crash system only allows the aircraft to operate on a course set by proper authorities before lift off.

4. The system of claim 2, further comprising an anti-crash system installed in a ground-based object that sends no-fly zone information comprising distance and height signals to the anti-crash system on the aircraft and signals causing the aircraft to avoid the ground-based object or other objects.

5. The system of claim 1, comprising an anti-crash system installed in a ground-based object that is configured to allow proper authorities to authorize changes in the course of the aircraft from the ground in emergency or crisis situations.

6. The system of claim 1, wherein the monitoring device system comprises an on-demand monitoring device system that is configured to automatically engage simultaneously when a problem is detected, the on-demand monitoring system enabling authorities to monitor on-board sensors.

7. The system of claim 6, wherein the on-demand monitoring device system includes a live feed of video and audio from the aircraft to a remote ground-based system.

8. The system of claim 3, wherein a course set before lift off in the aircraft can be changed during flight only by use of the authorities security aircraft flight equipment system installed in a ground-based object by multiple authorities entering multiple codes.

9. The system of claim 8, wherein the multiple codes are changed on a random basis to ensure that only authorized authorities can change a course or take control of an aircraft.

10. The system of claim 1, wherein the auto-controlling and piloting system allows authorities to authorize the operation of the aircraft in the event of pilot or crew member inability to safely pilot the aircraft due to any reason.

11. An aircraft protection system for use at all times while an aircraft is in service, the aircraft having a control system to operate aircraft flight and taxi controls and an on-board autopilot coupled to the control system to automatically operate the aircraft flight and taxi controls, the system for protecting aircraft operation comprising:

an on-board monitoring system configured to monitor the aircraft at all times while the aircraft is in service and to transmit communication signals;

an anti-crash control system on board the aircraft and coupled to the monitoring system and responsive to the communication signals to automatically and without human intervention transmit commands to prevent the aircraft from crashing into objects;

an auto-controlling and piloting system on board the aircraft that receives the commands from the anti-crash system and prevents control of the aircraft by the control system and the on-board autopilot, the auto-controlling and piloting system overriding the autopilot to control movement of the aircraft on the ground and in the air;

a secondary aircraft controller system on board the aircraft to control the aircraft flight and taxi controls in response to the auto-controlling and piloting system; and an authorities security aircraft flight equipment computer remote from the aircraft that communicates with the anti-crash system, the auto-controlling and piloting system, and the monitoring system.

12. The system of claim 11, wherein the anti-crash control system comprises an input for receiving the communication signal from the monitoring system and an output coupled to the auto-controlling and piloting system and secondary aircraft controller system, the anti-crash control system configured to assume control of the aircraft upon receipt of the communication signal and prevent control of the aircraft the aircraft control system and the on-board autopilot in the aircraft.

13. An aircraft management system for an aircraft having flight and taxi controls and an on-board autopilot coupled to the flight controls, the system comprising:

a monitoring system that monitors the operation of the aircraft at all times while the aircraft is in service to automatically detect when the aircraft is on a collision course with an object or the ground and automatically generating a detection signal when a collision course with an object or the ground is detected; and an anti-crash system coupled to the monitoring system for receiving the detection signal therefrom and coupled to the autopilot and coupled to the flight and taxi controls via a secondary control system on the aircraft, the anti-crash system responsive to the detection signal to send commands to an auto-controlling and piloting system on board the aircraft to automatically bypass the autopilot and control the path of the aircraft without any human intervention to avoid a collision with the object or the ground, the anti-crash system configured to prevent control by the on-board autopilot when the anti-crash system is activated.

14. A system for protecting aircraft operation, comprising:

an anti-crash system that automatically prevents an aircraft from colliding with other objects;

an auto-controlling and piloting system, receiving commands from said anti-crash system;

a monitoring device system communicating with said anti-crash system;

an authorities security aircraft flight equipment computer communicating with said anti-crash system, said auto-controlling and piloting system, and said monitoring system; and a secondary aircraft controller system, wherein a course set before lift off in the aircraft can be changed during flight only by use of the authorities security aircraft flight equipment computer installed in the ground-based object by three separate authorities entering three separate codes.

15. The system of claim 14, wherein the three separate codes are changed on a random basis to ensure that only authorized authorities can change a course or take control of an aircraft.

* * * * *